(12) United States Patent
Suzuki (10) Patent No.: US 6,514,173 B2
(45) Date of Patent: Feb. 4, 2003

(54) METHOD AND APPARATUS OF CONTROLLING TRANSMISSION SYSTEM

(75) Inventor: Hosei Suzuki, Tokyo-To (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 7 days.

(21) Appl. No.: 09/841,995

(22) Filed: Apr. 26, 2001

(65) Prior Publication Data

US 2002/0010052 A1 Jan. 24, 2002

(30) Foreign Application Priority Data

Apr. 28, 2000 (JP) .................................. 2000-130099

(51) Int. Cl.$^7$ .............................................. B60R 41/02
(52) U.S. Cl. ...................... 477/124; 477/83; 74/336 R; 74/337; 74/339
(58) Field of Search .......................... 477/79, 115, 86, 477/83, 109, 124; 701/54, 67, 68; 74/339, 340, 337, 336 R (56) References Cited

U.S. PATENT DOCUMENTS 4,627,312 A * 12/1986 Fujieda et al. .............. 477/124
5,954,776 A * 9/1999 Saito et al. ................. 477/115
6,164,149 A * 12/2000 Ohmori et al. ............. 477/121
6,349,253 B1 * 2/2002 Bellinger .................... 477/115
2001/0013258 A1 * 8/2001 Kobayashi ................... 74/359

FOREIGN PATENT DOCUMENTS

| JP | 61-045163 | 3/1986 |
|----|-----------|--------|
| JP | 62-261740 | 11/1987 |
| JP | 63-2735 | 1/1988 |
| JP | 2703169 | 10/1997 |

* cited by examiner

Primary Examiner—Sherry Estremsky
Assistant Examiner—Dennis Abdelnour
(74) Attorney, Agent, or Firm—Smith, Gambrell & Russell, LLP (57) ABSTRACT

An automatic transmission system has a switching mechanism for switching a plurality of shift gears and a sub-clutch by which transfer torque is controlled while being transferred from an input shaft to an output shaft. An actual deceleration speed is calculated based on an engine speed. Calculated next, based on an engine torque, is a target deceleration speed at which an output torque generated during upshifting is almost equal to an output torque generated after the upshifting. The transfer torque is controlled by feedback control so that the actual deceleration speed reaches the target deceleration speed.

11 Claims, 11 Drawing Sheets

METHOD AND APPARATUS OF CONTROLLING TRANSMISSION SYSTEM

BACKGROUND OF THE INVENTION

The present invention relates to a method and an apparatus of controlling an automatic transmission system based on a manual transmission.

The automatic transmission systems based on the well-known manual transmission are provided with several shift gears arranged in the axial direction and a switching mechanism, such as a synchronous mechanism for switching the shift gears. The transmission system works while the switching mechanism is being automatically controlled with hydraulic pressure.

Such automatic transmission systems are better for power transfer efficiency than generally used automatic transmission systems having planetary gears and friction-engaged elements such as a clutch and a brake, as main components. Moreover, the automatic transmission systems are assembled with a small number of components, thus achieving lightweight structure and low production cost.

Japanese Un-Examined Patent Publication No. 63-2735 discloses a similar automatic transmission system with a sub-clutch provided at the input shaft of a transmission system for reducing shock during gearshifting. In detail, the sub-clutch is controlled by the hydraulic pressure while a main clutch is engaged which is installed between an engine crankshaft and the input shaft of the transmission system. The sub-clutch engagement control will reduce sudden reduction of output torque during upshifting to reduce the shock which occurs due to less acceleration.

Japanese Un-Examined Patent Publication No. 61-45163 and Japanese Patent Publication No. 2703169 also disclose such automatic transmission systems.

Japanese Un-Examined Patent Publication No. 61-261740 discloses gearshift control for controlling engagement of a sub-clutch during upshifting while controlling a throttle opening to temporarily lower engine output. In detail, torque of inertia will be generated due to variation in engine speed while the speed is being reduced after gearshifting. Therefore, the shock could easily occur when engine torque is constant because of abrupt increase in transfer torque of the sub-clutch due to generation of torque of inertia. The transfer torque of the sub-clutch is controlled so that it becomes constant while the engine speed is varying with sudden decrease in engine torque by an amount corresponding to generated torque of inertia.

SUMMARY OF THE INVENTION

A purpose of the present invention is to provide a method and an apparatus of controlling a transmission system that can effectively reduce shock.

The present invention provides an apparatus for controlling an automatic transmission having a switching mechanism for switching a plurality of shift gears, and a sub-clutch for transferring a torque from an input shaft to an output shaft, comprising: a first calculator to calculate an actual deceleration speed based on an engine speed; a second calculator to calculate a target deceleration speed by referring to an output torque generated during upshifting based on an engine torque; and a controller for controlling the transfer torque by feedback control such that an actual deceleration speed converges to the target deceleration speed.

Moreover, the present invention provides a transmission control method of controlling an automatic transmission having a switching mechanism for switching a plurality of shift gears and a sub-clutch for transferring a torque from an input shaft to an output shaft, comprising: calculating an actual deceleration speed based on an engine speed; calculating a target deceleration speed by referring to an output torque generated during upshifting based on an engine torque; and controlling the transfer torque by feedback control such that the actual deceleration speed converges the target deceleration speed.

DETAILED DESCRIPTION OF PREFERRED EMBODIMENTS

Preferred embodiments according to the present invention will be disclosed with reference to the attached drawings.

Figure 1:
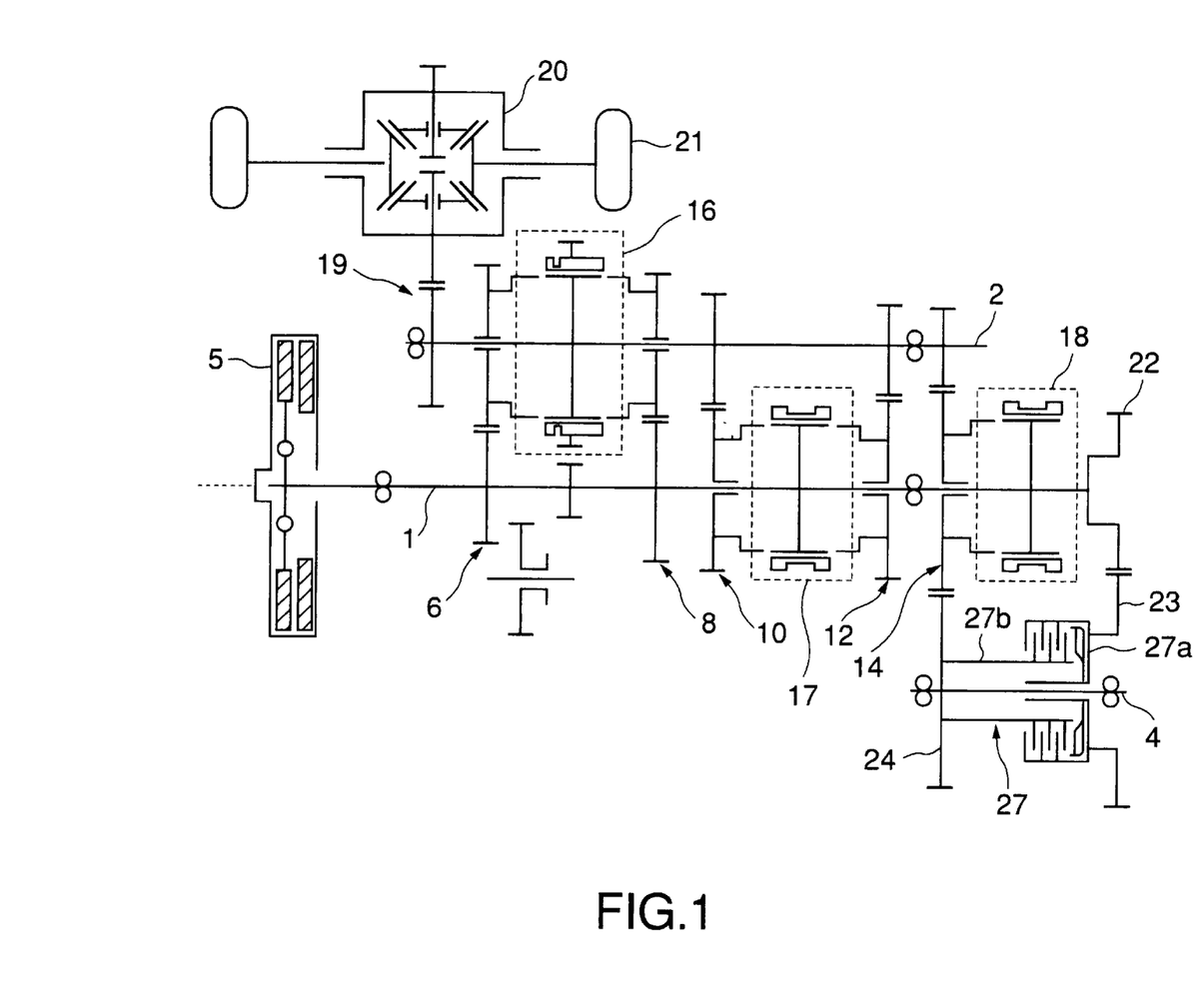
FIG. 1 is a schematic illustration of a skeleton of a five forward speed-automatic transmission system.

FIG. 1 is a schematic illustration of a skeleton of an automatic gear change transmission system with a forward five speed.

An input shaft 1, an output shaft 2 and an intermediate shaft 4 are arranged in parallel in a transmission housing. Power generated by an engine (not shown) is transferred to the transmission system via a single-plate main clutch 5. The main clutch 5 is automatically controlled with hydraulic pressure to transfer power of an engine crankshaft to the input shaft 1 or cut off the power.

Provided between the input and the output shafts 1 and 2 are gears having gear ratios for five forward speeds. Arranged on the input shaft 1 from the main clutch 5 side are a first-speed gear 6, a second-speed gear 8, a third-speed gear 10, a fourth-speed gear 12 and a fifth-speed gear 14.

Power generated on the input shaft 1 is transferred to the output shaft 2 via any one of the gears selected by synchronous mechanisms 16 to 18 in forward movement. The synchronous mechanisms 16 to 18 are well known mechanism automatically controlled with hydraulic pressure, which have a synchrohub, a synchrosleeve, a synchroring, etc.

Power generated on the output shaft 2 is reduced in accordance with a final reduction ratio of a final reduction gear 19 and transferred to a differential 20 to rotate a drive wheel 21.

As disclosed later, the synchronous mechanisms 16 to 18 are controlled as linked with control of transfer torque performed by a sub-clutch 27.

However, the synchronous mechanisms 16 to 18 themselves work as follows:

For the first-speed setting, the mechanism 16 is operated to the first gear 6 side by hydraulic pressure while the mechanisms 17 and 18 are set in neutral. As the operational amount of the mechanism 16 (shift amount of synchrosleeve) becomes larger, the synchrosleeve and a drive gear of the first-speed gear 6 are synchronized with each other in rotation.

At the timing in which the synchro-sleeve and the drive gear are synchronized with each other, outer splines formed on the drive gear are engaged with inner splines of the synchros-leeve. The power generated on the input shaft 1 is transferred to the output shaft 2 via the first-speed gear 6 and the synchronous mechanism 16 because the synchro-sleeve and the synchro-hub rotating with the output shaft 2 are always engaged at their splines.

For the second-speed setting, the synchro-sleeve of the synchronous mechanism 16 is operated to the second-speed gear 8 side by hydraulic pressure while the mechanisms 17 and 18 are set in neutral.

For the third- or fourth speed setting, the synchronous mechanism 17 is operated to the third-speed gear 10 side or the fourth-speed gear 11 side by hydraulic pressure while the mechanisms 16 and 18 are set in neutral.

Moreover, for the fifth- speed setting, the synchronous mechanism 18 is operated to the fifth-speed 14 side by hydraulic pressure while the mechanisms 16 and 17 are set in neutral.

The intermediate shaft 4 shown below the input shaft 1 is provided with the multi-plate sub-clutch 27 controlled by hydraulic pressure. The sub-clutch 27 consists of a pair of rotary components such as a clutch drum 27a and a clutch hub 27b.

The sub-clutch 27 is subjected to engagement during gearshifting, thus forming a torque transfer path between the input and output shafts 1 and 2 via the input side row of gears 22 and 23, the sub-clutch 27 and the output side row of gears 14 and 24.

The first intermediate gear 22 is fixed at the end of the input shaft 1 (at the opposite end of the main clutch 5) and engaged with the second intermediate gear 23. The gear 23 is attached on the intermediate shaft 4 but rotatable around the shaft 4, and further coupled with the clutch drum 27a of the sub-clutch 27. The sub-clutch hub 27b of the sub-clutch 27 is coupled with the third intermediate gear 24 fixed on the intermediate shaft 4 but rotatable around the shaft 4. The third gear 24 is engaged with the fifth-speed gear 14.

A gear ratio of the input side gears 22 to 23 or output side gears 14 to 24 is set so as to correspond to acceleration or deceleration. Generally, shock due to variation in output torque mostly occur at low-speed side (particularly, between the first and the second speed ranges) rather than high-speed side.

Under consideration of such shock, the present invention sets the total gear ratio (called bypass gear ratio Ib hereinafter) for the input and the output rows of gears 22 and 23, and 14 and 24 to cover the third and fourth speeds.

For example, the bypass gear ratio $\underline{Ib}$ is 1.125 when the gear ratio is 1.5 for the input side row of gears 22 and 23 (the number of teeth of the gears 22 and 23 are 20 and 30, respectively) and that is 0.75 for the output side row of gears 14 and 24 (the number of teeth of the drive gear of the fifth-speed gear 14 is 15 and that of the third intermediate gear 24 is 20). The bypass gear ratio $\underline{Ib}$ (1.125) corresponds to an intermediate ratio between the ratio (for example, 1.3) for the third speed and that (for example, 1.0) for the fourth speed.

Figure 2:
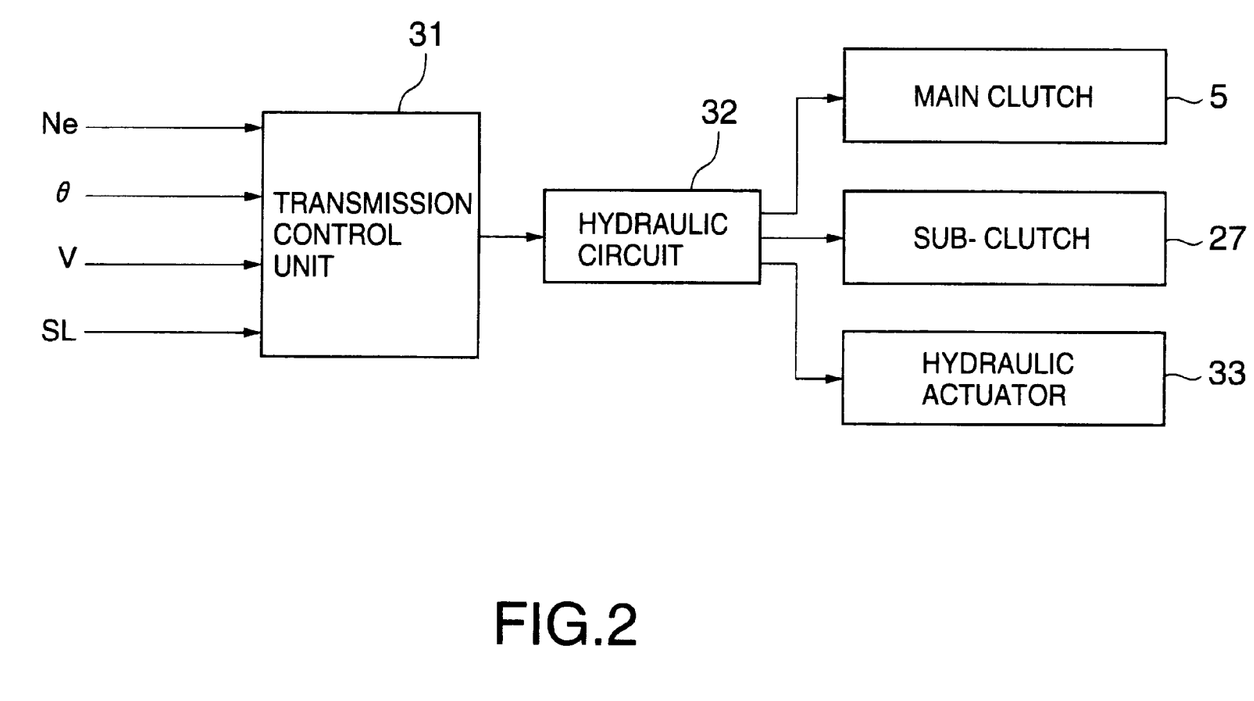
FIG. 2 shows a block diagram of a transmission controller according to the present invention.

The automatic transmission system disclosed above is controlled by a transmission controller shown in FIG. 2.

In FIG. 2, a transmission control unit 31 (microcomputer) accepts several kinds of data, such as, an engine speed Ne, a throttle opening θ, a vehicle speed V and a selector positional signal SL.

The engine speed Ne is detected by an engine-speed sensor. The throttle opening θ is detected by a throttle-opening sensor, which is an opening of an electric throttle valve driven by an electric motor. The electric throttle valve is not mechanically liked with an accelerator pedal. The throttle opening θ is controlled by an ECU having a microcomputer.

The vehicle speed V is detected by a vehicle-speed sensor. The selector positional signal SL, indicating a selected position of a selector lever, is detected by a switch provided on an operation device having the selector lever.

The transmission control unit 31 refers to a drive range map that has been stored in ROM to select a gear among the first- to fifth-speed gears suitable for the present driving condition.

The drive range map lists the relationship between basic input variables, such as vehicle speed V and throttle opening θ, and drive ranges PG to be selected among the first- to fifth-speed.

The transmission control unit 31 sends a control signal to a hydraulic circuit 32 that includes an oil pump, an electromagnetic valve and a hydraulic regulator, etc., driven by engine or electric motor.

In response to the control signal from the transmission control unit 31, the hydraulic circuit 32 supplies an adjusted hydraulic pressure to the main clutch 5, the sub-clutch 27 or a hydraulic actuator 33. The actuator 33 includes actuators for operating the synchronous mechanisms 16 to 18.

Figure 3:
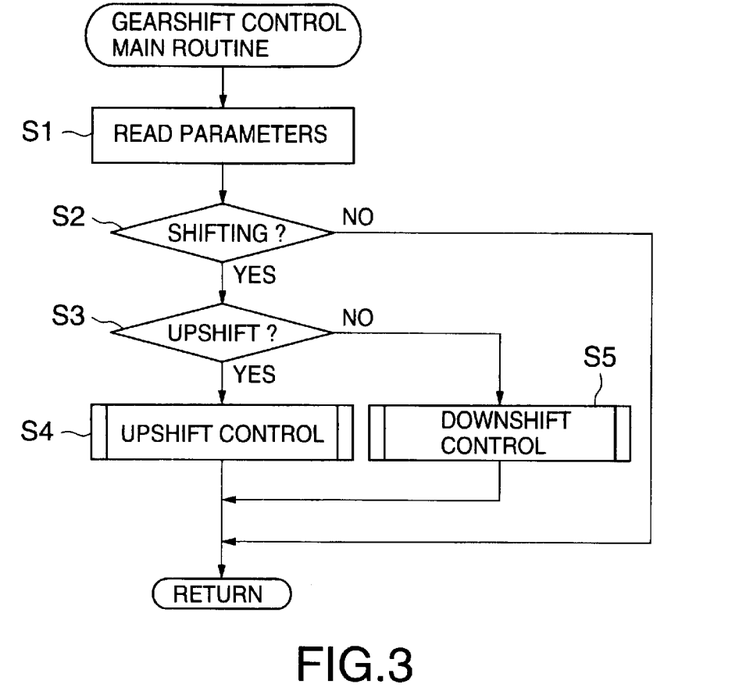
FIG. 3 shows a flow chart depicting a gearshift-control main routine.

FIG. 3 shows a flow chart showing a gearshift-control main routine repeatedly executed by the transmission control unit 31 for every predetermined period, for example, 10 ms.

Several parameters (Ne, θ, V, etc.) indicating the present driving condition are read into the transmission control unit 31 in STEP S1. A driver operates the selector lever to set the selector position SL in the forward driving range (range D), thus setting at the first speed. The driver then releases a brake pedal and steps on an accelerator pedal, so that the hydraulic circuit 32 generates hydraulic pressure for engaging the main clutch 5, thus a vehicle goes forward.

When the present drive range becomes different from a drive range PG selected according to the drive range map as the vehicle speed V (and other parameters) increases in STEPS S2 and S3, the present drive range is upshifted to the selected range PG in STEP S4. The upshift control is one of the features of the present invention and will be disclosed later in detail.

On the other hand, when the present drive range becomes different from a drive range PG selected according to the drive range map as the vehicle speed V (and other parameters) decreases in STEPS S2 and S3, the present drive range is downshifted to the selected range PG in STEP S5.

The downshift control operates the synchronous mechanisms 16 to 18 while releasing the main clutch 5 and the sub-clutch 27.

The upshift control according to the present invention will now be disclosed with taking, as an example, upshifting from the first speed to the second speed.

In this upshift control, the engagement of the sub-clutch 27 is controlled so that the transfer torque (called sub-clutch torque hereinafter) is varied in accordance with the selected drive range while the main clutch 5 is being engaged.

Figure 4:
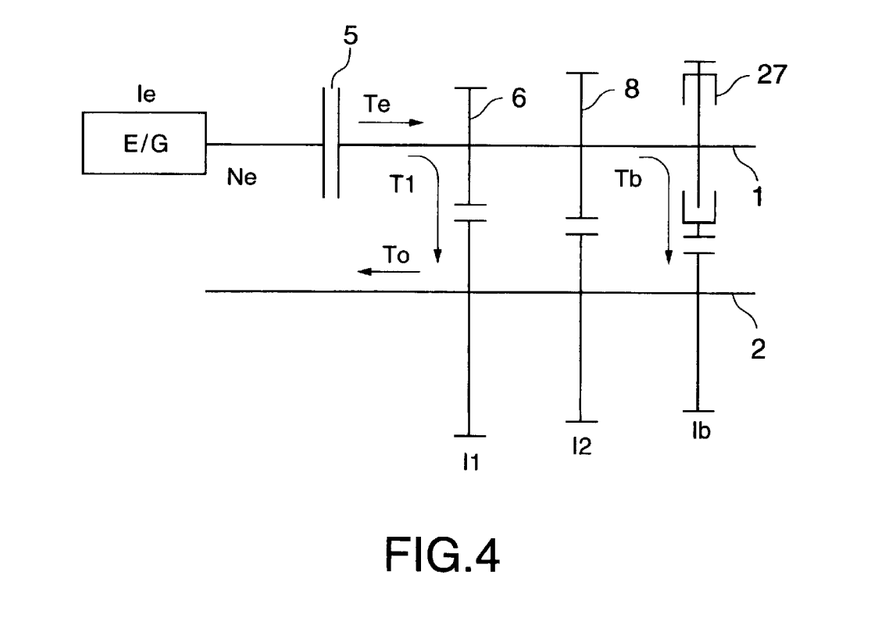
FIG. 4 is a schematic partial illustration of the skeleton of the five forward speed-automatic transmission system shown in FIG. 2 depicting transfer torque in upshifting.

FIG. 4 is a schematic partial illustration of the skeleton of the forward five speed-automatic transmission system shown in FIG. 2 showing transfer torque from the input shaft 1 to the output shaft 2 in upshifting.

The first-speed gear ratio I1, the second-speed gear ratio I2 and the bypass gear ratio $\underline{Ib}$ (I1>I2>Ib) and also the moment of inertia $\underline{Ie}$ for the input shaft 1 and the engine, flywheel, etc., are known constant values.

An engine torque Te generated by the engine is determined with reference to an engine torque-calculating map using the throttle opening θ and the engine speed Ne as basic variables. The engine torque-calculating map has been stored in ROM of the transmission controller 31, which lists the relationship between the input variables θ and Ne and the output variable Te (engine torque).

The relationship among the engine torque Te, a transfer torque (called the first-speed gear torque hereinafter) Tl via the first-speed gear 6, and the sub-clutch torque Tb is expressed as $$Te = Tl + Tb \qquad (1)$$

when first and second transfer paths are formed via the first-speed gear 6 and the sub-clutch 27, respectively, as illustrated in FIG. 4.

Then, an output torque To to be transferred to the output shaft 2 is expressed as follows:

$$\begin{aligned} To &= Tb \cdot Ib + Tl \cdot Il \\ &= Tb \cdot Ib + (Te - Tb) \cdot Il \\ &= Te \cdot Il - Tb \cdot (Il - Ib) \end{aligned} \qquad (2)$$

Figure 5:
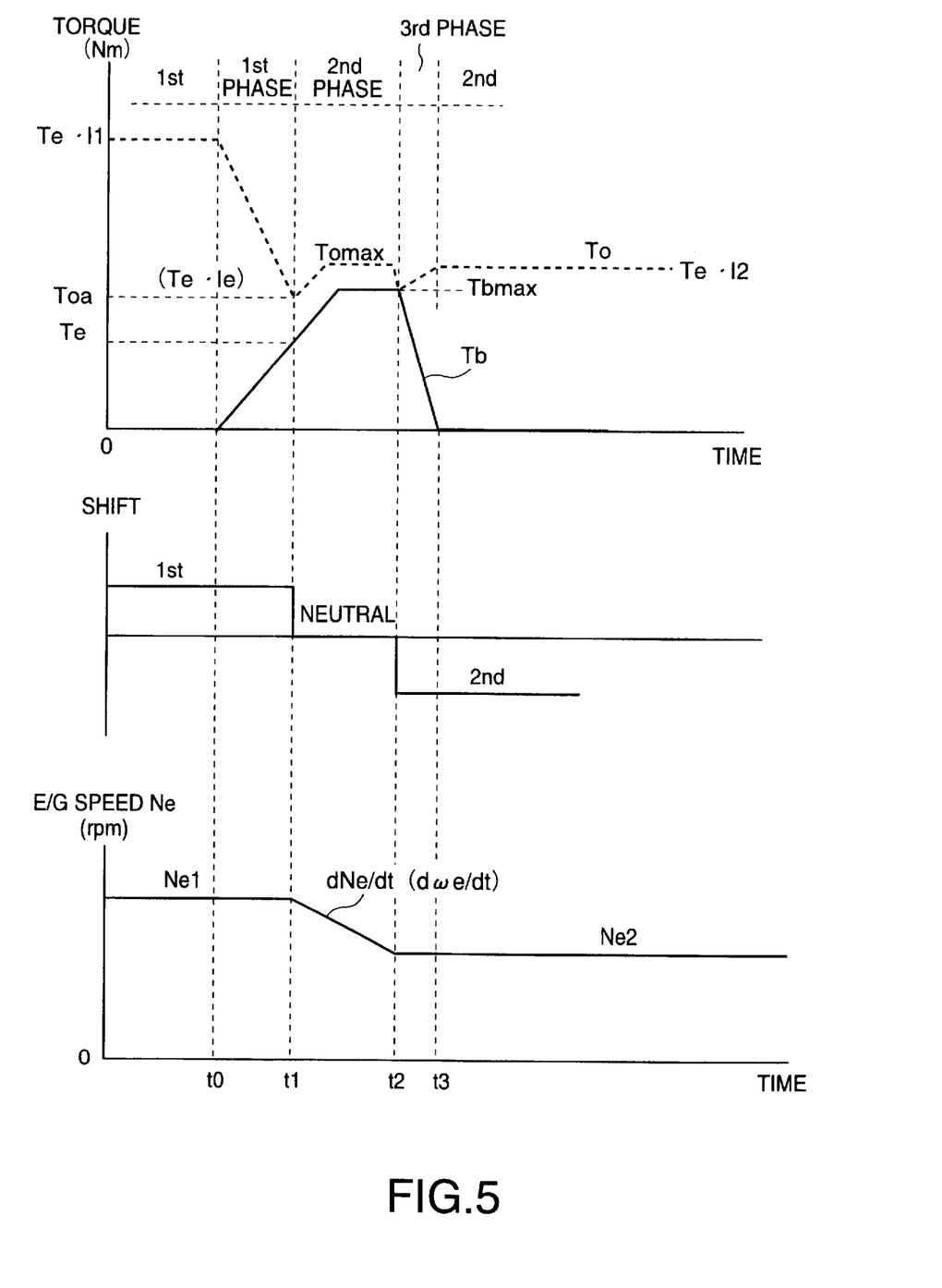
FIG. 5 is a time chart in upshifting.

The upshift control according to the present invention will be disclosed further with reference to timing charts shown in FIG. 5.

The upshift control is sequentially executed in order of the first-phase mode, the second-phase mode and the third-phase mode for a shifting period from a shift-starting moment t0 to a shift-completion moment t3.

In detail, the first-phase mode control is executed for a period from the shift-starting moment t0 to a first-phase shift-completion moment t1. The transfer torque Tl via the first-speed gear 6 becomes almost zero at the first-phase shift-completion moment t1.

The second-phase mode control is executed for a period from the first-phase shift-completion moment t1 to a second-phase shift-completion moment t2. The engine speed Ne reaches a target speed Ne2 for the second speed at the second-phase shift-completion moment t2.

The third-phase mode control is executed for a period from the second-phase shift-completion moment t2 to the shift-completion moment t3. The sub-clutch 27 is released so that the sub-clutch torque Tb becomes zero at the shift-completion moment t3.

During the shifting period from the moments t0 to t3, the main clutch 5 is kept as being engaged while the two synchronous mechanisms 17 and 18 are kept in neutral because they are not required for upshift control.

First-Phase Upshift Control

Figure 6:
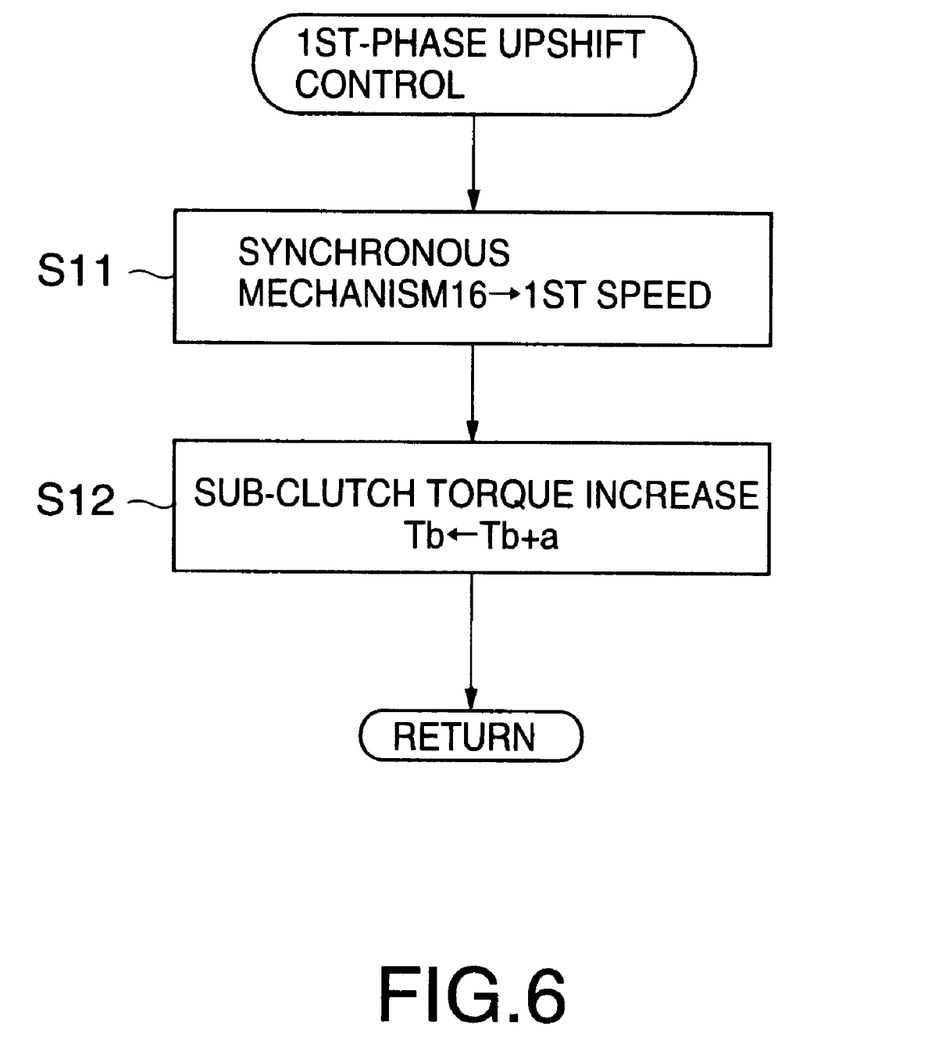
FIG. 6 is a flow chart depicting the first-phase upshift control routine.

FIG. 6 is a flow chart depicting the first-phase upshift control routine repeatedly executed by the transmission control unit 31 (FIG. 2) at predetermined intervals for the first-phase control period (t0 to t1).

In FIG. 6, the synchronous mechanism 16 is kept at the first-speed side in STEP S11. The sub-clutch torque Tb is gradually increased from the initial value zero while the mechanism 16 is being engaged with the first-speed gear 6 in STEP S12. This results in that the engine torque Te has been completely transferred to the output shaft 2 via the first-speed gear 6 at the first-phase shift-starting moment t0 (FIG. 5), thus the output torque To being obtained as Te·$\underline{Il}$ according to the equation (2).

The procedure in STEP S12 is executed for every execution cycle of the routine in FIG. 6 to add a predetermined value "a" (a>0) to the sub-clutch torque Tb, thus Tb being linearly increased. In other words, when the engine torque Te is constant, the first-speed gear torque T1 and the output torque To are gradually decreased as the engagement of the sub-clutch 27 becomes stronger as time passes, according to the equation (2). Then, the first-phase upshift control is shifted to the second-phase upshift control when the sub-clutch torque Tb has been increased to a value almost equal to the engine torque Te.

Second-Phase Upshift Control

Figure 7:
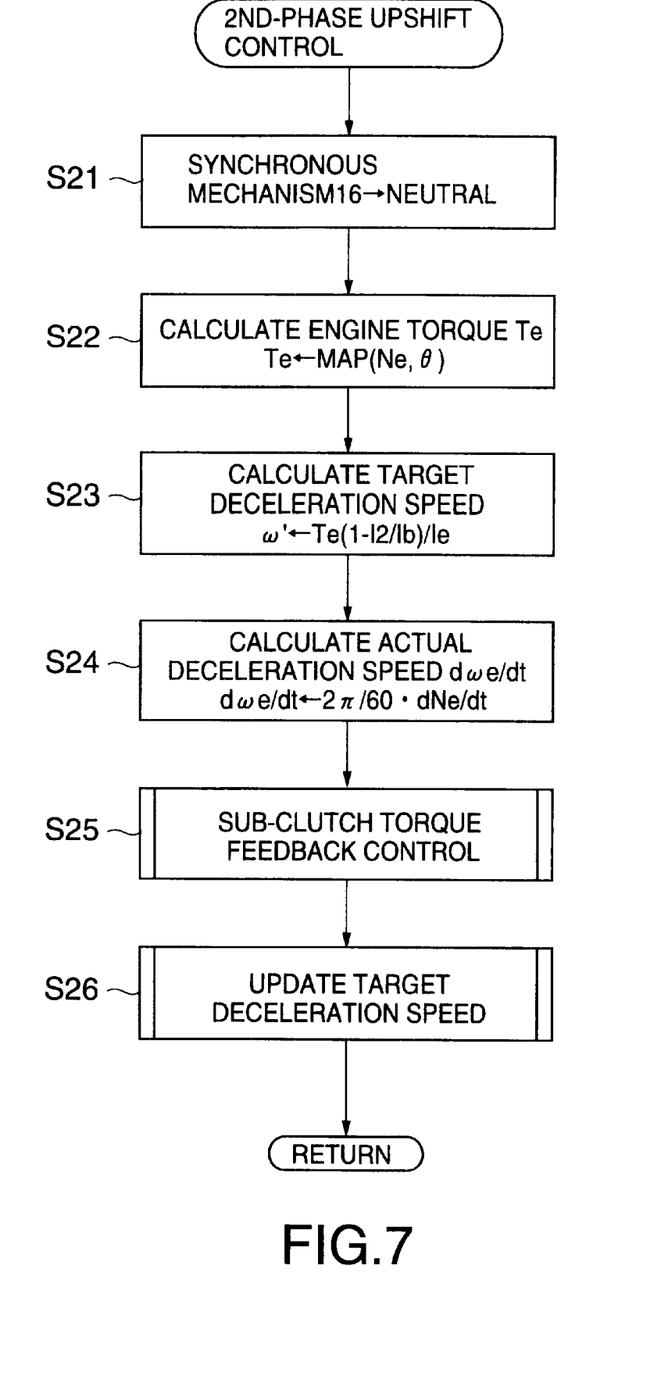
FIG. 7 is a flow chart depicting the second-phase upshift control routine.

FIG. 7 is a flow chart depicting the second-phase upshift control routine repeatedly executed by the transmission control unit 31 (FIG. 2) at predetermined intervals for the second-phase control period (t1 to t2).

In FIG. 7, the synchronous mechanism 16 is shifted from the first-speed side to neutral in STEP S21, the neutral state being kept during the second-phase upshift control. The mechanism 16 can be operated with almost no load because the first-speed gear torque T1 is almost zero at the second-phase shift-starting moment t1 (FIG. 5). The second-phase control performs torque transfer only on the transfer path via the sub-clutch 27. The engine speed Ne is gradually decreased after the moment t1 due to the bypass gear ratio Ib smaller than the first-speed gear ratio $\underline{I1}$.

A feedback control is applied to the sub-clutch torque Tb in the procedures from STEP 22.

A feature of the present invention in the feedback control is that the sub-clutch torque Tb is controlled so that the maximum value Tomax of the output torque To for the second-phase control period (t1 to t2) is set almost equal to a target output torque (Te·I2) set for post-gearshifting.

Figure 8:
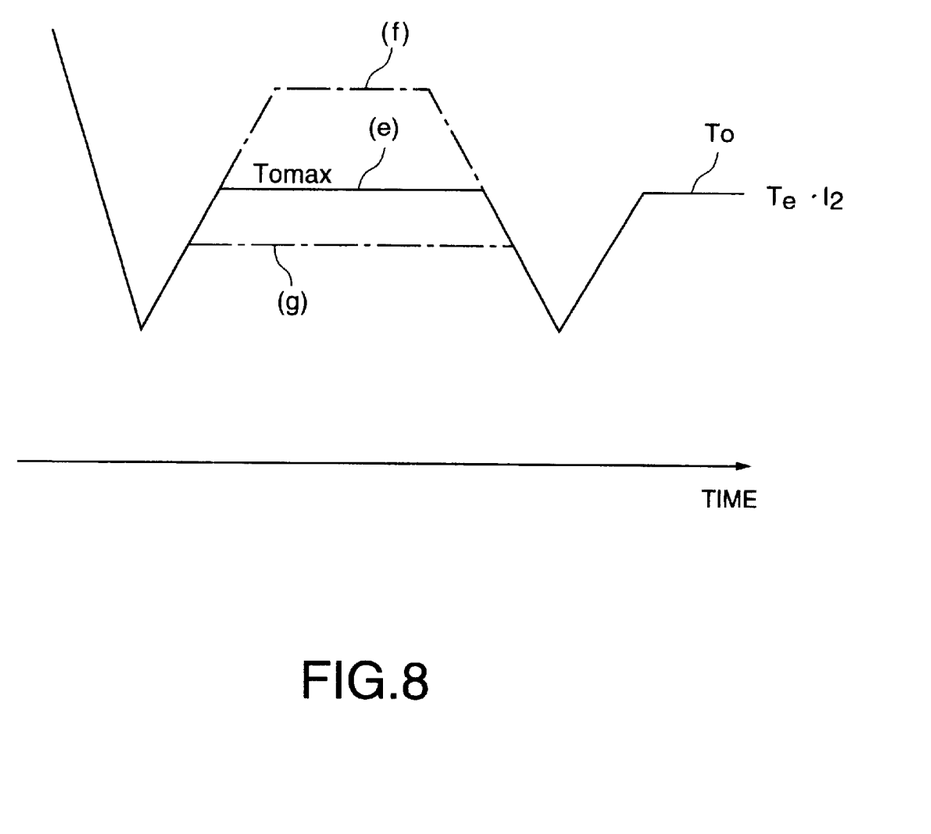
FIG. 8 illustrates the maximum output torque Tomax.

In detail, as shown in FIG. 8, the sub-clutch torque Tb is controlled so that the maximum output torque Tomax for the second-phase control period lies in the level indicated by a solid line(e). This torque-level setting eliminates lurches which may otherwise occur due to variation in output torque To.

On the other hand, when the maximum output torque Tomax becomes larger than the target output torque (Te·I2) as indicated by a dashed line (f), a driver will feel a forward shock, thus lowering shifting performance. Moreover, when the maximum output torque Tomax becomes smaller than the target output torque (Te·I2) as indicated by another dashed line (g), a driver will feel a backward shock, thus also lowering shifting performance.

The sub-clutch torque Tb is controlled by the feedback control so that an actual deceleration speed dωe/dt (feedback variable) reaches a target deceleration speed ω' as a target control value. The target deceleration speed ω' is set at a value by which the maximum output torque Tomax becomes the target output torque (Te·I2).

The target deceleration speed ω' is calculated as follows:

In STEP S22 (FIG. 7), the engine torque Te is calculated with reference to the engine torque calculating map based on the engine speed Ne and the throttle opening θ.

The target decelerated speed ω' is determined as ω' =f (Te), as described below, based on the engine torque Te calculated in STEP S22.

The output torque To and the sub-clutch torque Tb have the following relationship:

$$To=Tb \cdot Ib \quad (3)$$

Then, a value Tbmax (called maximum sub-clutch torque Tbmax hereinafter) of the sub-clutch torque Tb that will become the maximum output torque Tomax (=Te·I2) is calculated according to the equation (4) shown below.

$$Tb\text{max} = T\text{omax}/Ib \quad (4)$$
$$= Te \cdot I2/Ib$$

When the engine torque Te varies as the engine speed Ne varies, the maximum sub-clutch torque Tbmax is calculated based on a varied engine torque Te.

In general, variation in engine speed Ne will cause generation of torque of inertia Ie·dωe/dt due to moment of inertia Ie on the input shaft and the engine and flywheel where ωe indicates an engine angular velocity having the following relationship with the engine speed Ne.

$$\omega e/2\pi=Ne/60 \quad (5)$$

Moreover, the engine torque Te, torque of inertia Ie·dωe/dt and the sub-clutch torque Tb have the following relationship:

$$Te-Ie \cdot d\omega e/dt=Tb \quad (6)$$

This equation suggests that a torque of inertia Ie·dωe/dt will be generated to increase the sub-clutch torque Tb when the engine speed Ne is lowering, or a deceleration speed dωe/dt (a rate of change in Ne) becomes a negative value.

The equations (4) and (6) give a target deceleration speed ω' or a deceleration speed dωe/dt, as shown below in STEP S23 (FIG. 7), for obtaining the maximum sub-clutch torque Tbmax.

$$\omega' = (Te - Tb\text{max})/Ie \quad (7)$$
$$= Te(1 - I2/Ib)/Ie$$

As disclosed, the target deceleration speed ω' indicates a target value of a rate of change in engine speed Ne required for generating torque of inertia to increase the maximum output torque Tomax to a level of Te·I2.

In FIG. 7, an actual deceleration speed dωe/dt is calculated based on an engine speed Ne detected by the engine speed sensor in STEP S24. In detail, the actual deceleration speed dωe/dt is obtained as follows (dωe/dt=f(Ne)):

$$d\omega e/dt=(2\pi/60) \cdot dNe/dt \quad (8)$$

Then, in STEP S25, the sub-clutch torque Tb is increased or decreased by feedback control so that a deviation between the target deceleration speed ω' obtained in STEP S23 and the actual deceleration speed dωe/dt obtained in STEP S24 becomes small.

Figure 9:
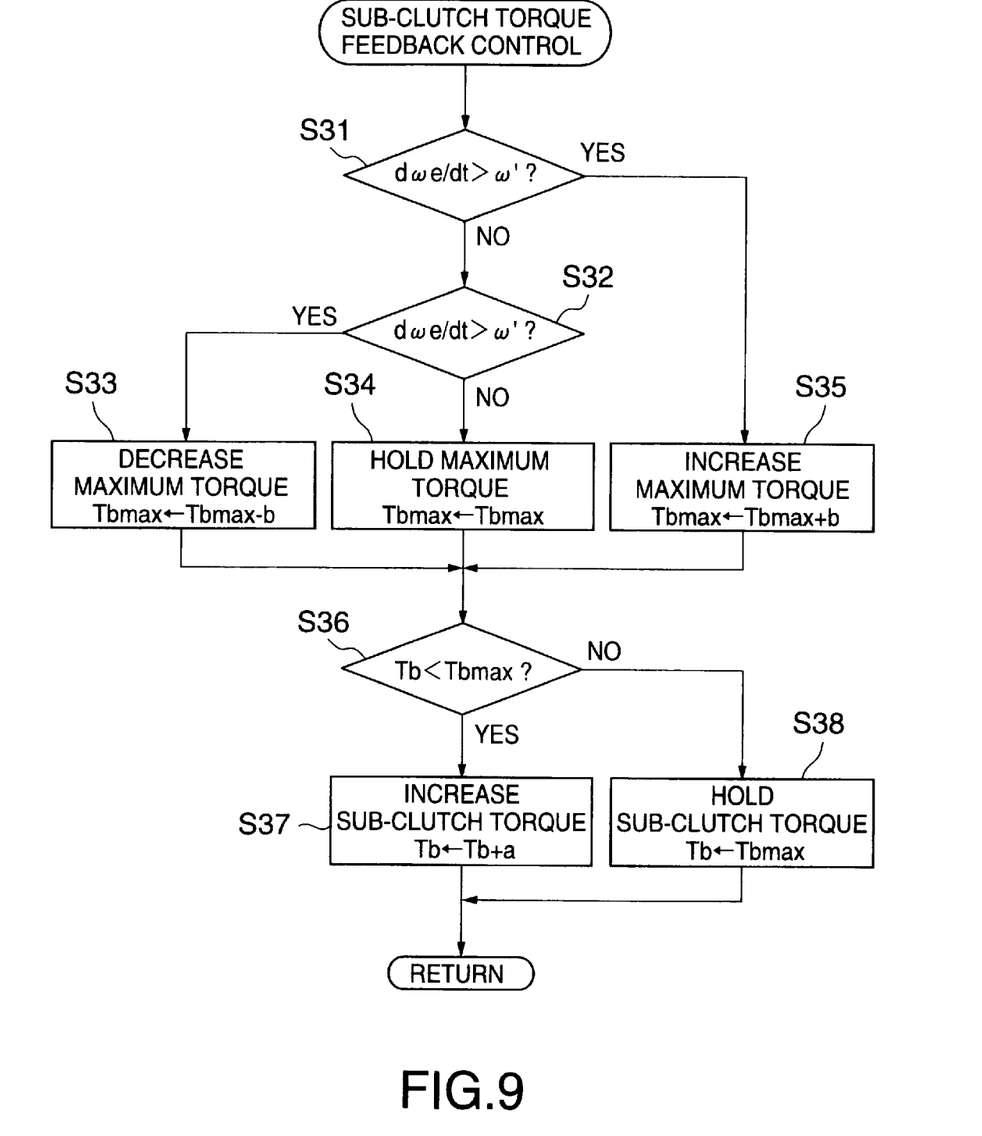
FIG. 9 is a flow chart depicting the sub-clutch torque feedback control.

FIG. 9 is a flow chart illustrating the detailed procedures of the feedback control in STEP S25 (FIG. 7).

In STEP S31, it is determined whether or not the actual deceleration speed dωe/dt is larger than the target deceleration speed ω'.

It is noted that, while the engine speed Ne is lowering, the actual deceleration speed dωe/dt (a rate of change in engine speed Ne) and the target deceleration speed ω' become negative.

Figure 10:
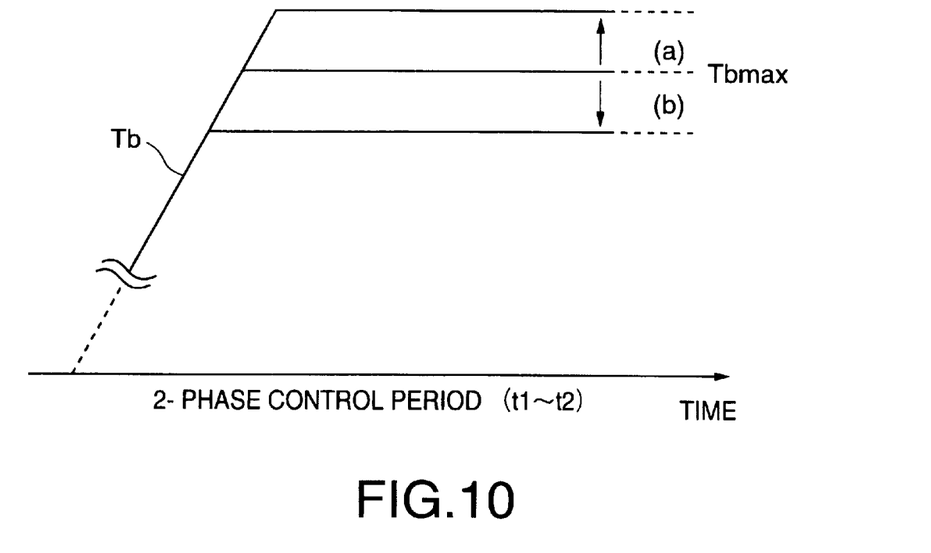
FIG. 10 illustrates the maximum sub-clutch torque Tbmax.
Figure 11:
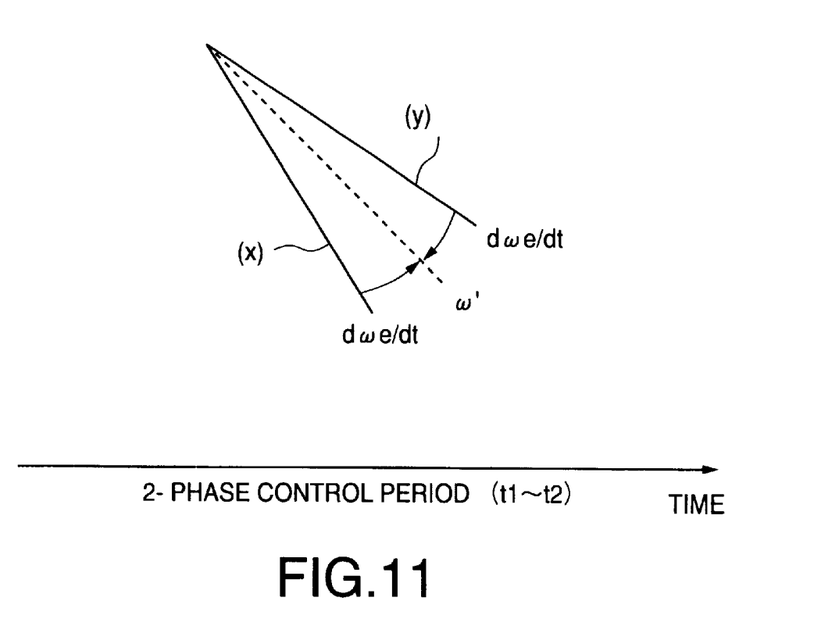
FIG. 11 illustrates actual deceleration speed $d\omega e/dt$.

The process goes to STEP S35 to increase the maximum sub-clutch torque Tbmax by a predetermined value b (>0) in the direction indicated by an arrow (a) in FIG. 10 when the actual deceleration speed dωe/dt is larger than the target deceleration speed ω' (|dωe/dt |<|ω'|), or a gradient (x) of the actual deceleration speed dωe/dt is smaller than that of the target deceleration speed ω', as shown in FIG. 11.

On the other hand, the process goes to STEP S33 via STEPS S31 and S32 to decrease the maximum sub-clutch torque Tbmax by the predetermined value b in the direction indicated by an arrow (b) in FIG. 10 when the actual deceleration speed dωe/dt is smaller than the target deceleration speed ω' (|dωe/dt |<|ω'|), or a gradient (y) of the actual deceleration speed d ωe/dt is larger than that of the target deceleration speed ω', as shown in FIG. 11.

Moreover, the process goes to STEP S34 via STEPS S31 and S32 to hold the maximum sub-clutch torque Tbmax when the gradient of the actual deceleration speed dωe/dt meets that of the target deceleration speed ω' in FIG. 11.

Next, it is determined whether or not the sub-clutch torque Tb has reached the maximum sub-clutch torque Tbmax in STEP S36 (FIG. 9). If yes, the process goes to STEP S37 to increase the sub-clutch torque Tb by a predetermined value "aa" whereas, if no, it goes to STEP S38 to hold the sub-clutch torque Tb at the maximum sub-clutch torque Tbmax.

The procedure in STEP S37 is repeated until the sub-clutch torque Tb has reached the maximum sub-clutch torque Tbmax after the second-phase control-starting moment t1 (FIG. 5), thus the sub-clutch torque Tb being linearly increased.

Once the sub-clutch torque Tb has reached the maximum sub-clutch torque Tbmax, the procedure in STEP S36 is repeated to hold the torque Tb at the maximum torque Tbmax.

The maximum sub-clutch torque Tbmax is increased or decreased in STEPS S33 or S35 as disclosed, hence the maximum output torque Tomax is controlled by feedback control so that it reaches a level of an output torque (Te·I2) after gearshifting.

Accordingly, the engine speed Ne can be lowered by means of the actual deceleration speed dωe/dt corresponding to the target deceleration speed ω' irrespective of disturbances, such as, variation in hydraulic pressure applied to the sub-clutch 27 or variation in volume of the clutch.

Therefore, the present invention achieves precise control of the maximum output torque Tomax at the level of output torque (Te·I2) after gearshifting, which will not give a driver feeling of a forward or a backward shock, thus enhancing smooth gearshifting.

The target deceleration speed ω' is updated in STEP S26 (FIG. 7) to appropriately set the speed ω' as a target value in feedback control.

Figure 12:
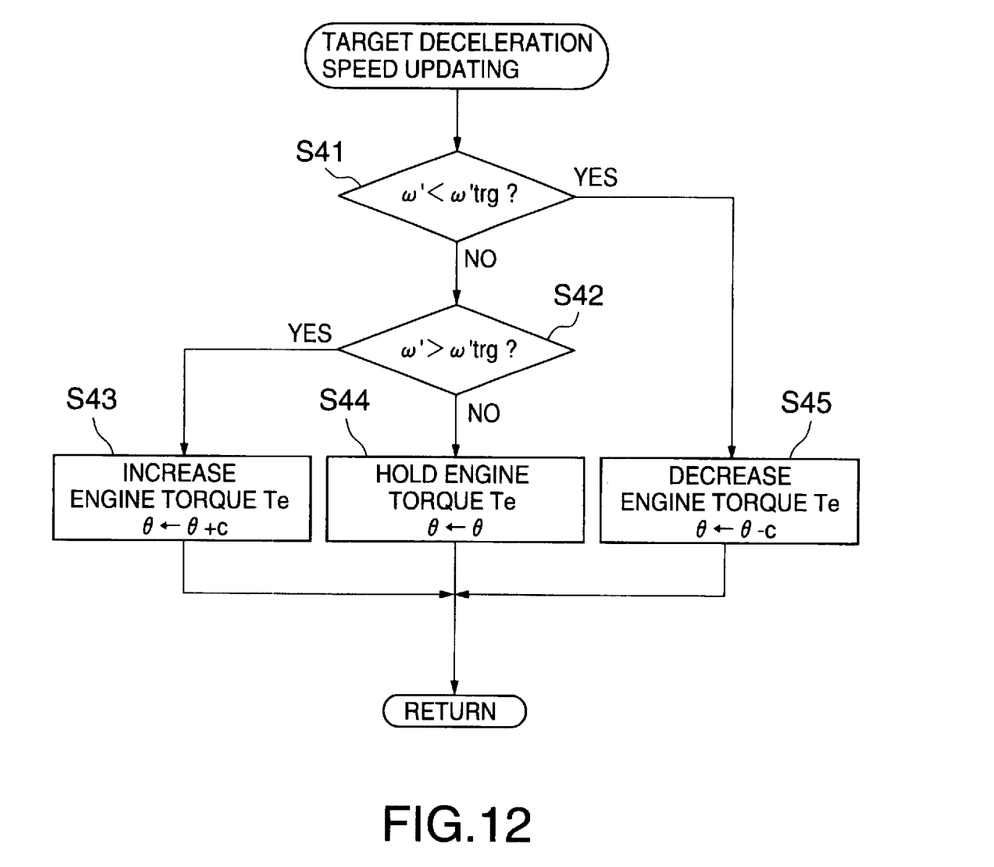
FIG. 12 is a flow chart depicting the target deceleration speed updating.

FIG. 12 is a flow chart illustrating the detailed procedures of the target deceleration speed updating.

It is determined in STEP S41 whether or not the target decelerated speed ω' is smaller than a predetermined target value ω'trg (<0).

Figure 13:
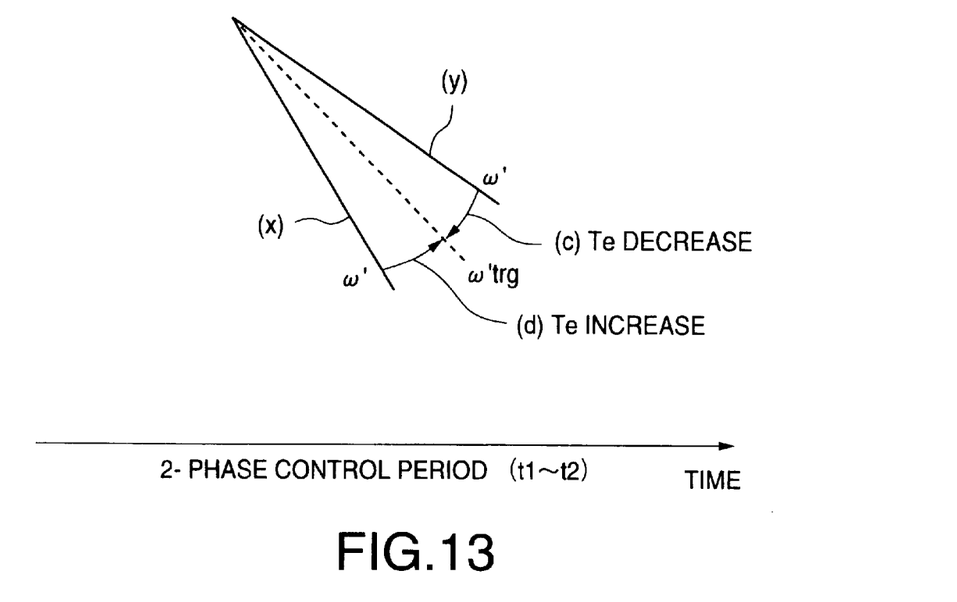
FIG. 13 illustrates the target deceleration speed $\omega'$.

A target deceleration speed ω' smaller than the target value ω'trg (|ω'|>|ω'trg|), or a gradient (y) of the actual deceleration speed d ω e/dt larger than that of the target deceleration speed ω', as shown in FIG. 13, could cause inappropriate gearshifting due to abrupt change in engine speed Ne, which causes difficulty in synchronization with the second-speed gear 8.

To avoid such problems, the present invention closes the throttle opening θ by a predetermined value "c" (>0) to lower the engine torque Te in STEP S45 (FIG. 12). This throttle opening adjustments offers a large target deceleration speed ω' (a small gradient), as shown in an arrow (d) in FIG. 13.

On the other hand, a target deceleration speed ω' larger than the target value ω'trg (|ω'|<|ω'trg|), or a gradient (x) of the actual deceleration speed dωe/dt smaller than that of the target deceleration speed ω', as shown in FIG. 12, could give the driver to feel that gearshift takes long due to longer second-phase control period (t1 to t2) in FIG. 5.

To avoid such a problem, the present invention opens the throttle opening θ by the predetermined value "c" (>0) to increase the engine torque Te in STEP S43 (FIG. 12). This throttle opening adjustments offers a small target deceleration speed ω' (a large gradient), as shown in an arrow (c) in FIG. 13, thus offering appropriate gearshift period setting.

Moreover, the process goes to STEP S44 via STEPS S41 and S42 to hold the engine torque Te when the target deceleration speed ω' is almost equal to the target value ω'trg, or a gradient of the speed ω' meets that of the value ω'trg in FIG. 13.

Increase or decrease in engine torque Te can be performed by adjusting ignition timing, driving a crankshaft starter generator (CSG), etc., other than control of throttle opening θ.

Third-Phase Upshift Control

Figure 14:
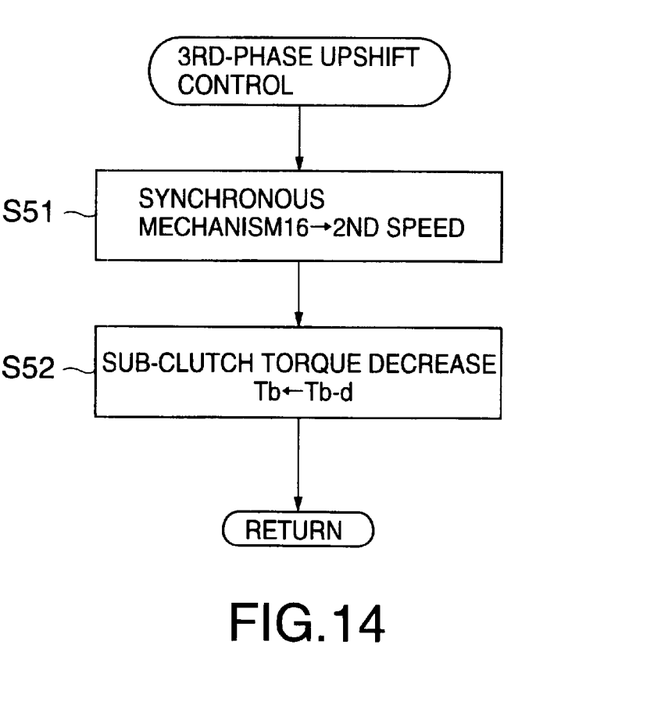
FIG. 14 is a flow chart depicting the third-phase upshift control routine.

FIG. 14 is a flow chart depicting the third-phase upshift control routine repeatedly executed by the transmission control unit 31 (FIG. 2) at predetermined intervals for the third-phase control period (t2 to t3) in FIG. 5.

In FIG. 14, the synchronous mechanism 16 is shifted from the neutral to the second-speed side in STEP S51, the second-speed state being kept during the third-phase upshift control. The mechanism 16 can be operated with almost no load because the engine speed Ne is almost equal to a speed Ne2 for the second-speed at the third-phase shift-starting moment t2. The sub-clutch torque Tb is gradually decreased in STEP S52.

The sub-clutch torque Tb is set at the maximum value Tbmax at the third-phase shift-starting moment t2. The procedure in STEP S52 is repeated to decrease the sub-clutch torque Tb by a predetermined value "d" (>0), thus the sub-clutch torque Tb being linearly decreased. The third-phase upshift control is completed at the moment t3 at which the sub-clutch torque Tb has been decreased to zero, or the sub-clutch 27 has been completely released, thus upshift control from the first-speed to the second-speed being completed.

Disclosed so far is the upshift control from the first-speed to the second-speed, however, the present invention is also applicable to other upshift control, such as from the second-speed to the third-speed.

As disclosed, according to the present invention, the sub-clutch torque Tb is controlled by the feedback control so that an actual deceleration speed d ω e/dt reaches a target deceleration speed ω'. The target deceleration speed ω' is set at a value by which the maximum output torque Tomax becomes the target output torque set for post-gearshifting, which is Te·I2 in upshifting from the first to the second speed. Thus, the present invention effectively restricting lurches.

Moreover, according to the present invention, the sub-clutch torque Tb is controlled by feedback control of dωe/dt (a rate of change in engine speed Ne). Thus, the present invention achieves precise torque transfer control using the sub-clutch 27 irrespective of disturbances, such as, variation in hydraulic pressure applied to the sub-clutch 27 or variation in volume of the clutch.

Furthermore, according to the present invention, the target decelerated speed ω' (target value in feedback control) is controlled so that it reaches a predetermined target value ω'trg.

A target deceleration speed ω' larger than the target value ω'trg could give the driver to feel that gearshift takes long due to longer gearshifting period.

To avoid such a problem, the present invention increases the engine torque Te to produce a small target deceleration speed ω'.

On the other hand, a target deceleration speed ω' smaller than the target value ω'trg could cause difficulty in synchronization with shift gears or increase in load applied to the synchronous mechanisms due to shorter gearshifting period.

To avoid such problems, the present invention lowers the engine torque Te to produce a large target deceleration speed ω'.

Accordingly, the present invention provides optimization of gearshifiting period to shorten the period and precise gearshifiting with high durability of synchronous mechanisms.

The embodiment employs synchronous mechanisms for switching shift gears, however, not only that, a simple switching mechanism with no synchronizing function, such as a dog clutch, can be used for controlling the sub-clutch 27 with hydraulic pressure for torque transfer and gearshift timing.

As disclosed above, according to the present invention, sub-clutch torque is controlled by feedback control so that an actual deceleration speed reaches a target deceleration speed.

This feedback control allows precise control of sub-clutch torque irrespective of disturbances, such as, variation in hydraulic pressure applied to the sub-clutch or variation in volume of the clutch, thus effectively restricting lurches.

While there has been described what are at present considered to be preferred embodiments of the present invention, it will be clearly understood that various modifications may be made thereto, and it is intended that the appended claims cover all such modifications as fall within the true spirit and scope of the invention.

What is claimed is:

1. An apparatus for controlling an automatic transmission having a switching mechanism for switching a plurality of shift gears, and a sub-clutch for transferring torque from an input shaft to an output shaft, comprising:

a first calculator to calculate an actual deceleration speed based on an engine speed;

a second calculator to calculate a target deceleration speed by referring to an output torque generated during upshifting based on an engine torque; and a controller for controlling transfer torque by feedback control such that the actual deceleration speed converges to the target deceleration speed.

2. A transmission control method of controlling an automatic transmission having a switching mechanism for switching a plurality of shift gears and a sub-clutch for transferring torque from an input shaft to an output shaft, comprising:

calculating an actual deceleration speed based on an engine speed;

calculating a target deceleration speed by referring to an output torque generated during upshifting based on an engine torque; and controlling transfer torque by feedback control such that the actual deceleration speed converges to the target deceleration speed.

3. The transmission control method according to claim 2 wherein said calculation of the target deceleration speed includes calculating engine torque based on engine speed and a throttle opening.

4. The transmission control method according to claim 2, said calculating of the target deceleration speed includes calculating the target deceleration speed based on a target speed of the output shaft.

5. The transmission control method according to claim 2, wherein the controlling includes controlling transfer torque so that the transfer torque is increased when the actual deceleration speed is higher than the target deceleration speed.

6. The transmission control method according to claim 2, wherein the controlling includes controlling transfer torque so that the transfer torque is decreased when the actual deceleration speed is lower than the target deceleration speed.

7. The transmission control method according to claim 2, wherein the transfer torque is controlled so that engine torque is increased when the target deceleration speed is higher than a predetermined target speed.

8. The transmission control method according to claim 7, further comprising:

increasing engine torque by temporarily varying the throttle opening.

9. The transmission control method according to claim 2, wherein controlling includes controlling transfer torque so that engine torque is decreased when the target deceleration speed is lower than a predetermined target speed.

10. The transmission control method according to claim 9, further comprising:

decreasing engine torque by temporarily varying the throttle opening.

11. A motor vehicle equipped with the apparatus of claim 1.

* * * * *